United States Patent
Marsan et al.

(10) Patent No.: US 7,426,390 B2
(45) Date of Patent: Sep. 16, 2008

(54) METHOD AND APPARATUS FOR EFFICIENT NEIGHBOR CELL MEASUREMENT

(75) Inventors: Mark J. Marsan, Elmhurst, IL (US); Bruce M. Drawert, Arlington Heights, IL (US); Larry P. Hemenway, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 131 days.

(21) Appl. No.: 10/938,185

(22) Filed: Sep. 10, 2004

(65) Prior Publication Data

US 2006/0058033 A1    Mar. 16, 2006

(51) Int. Cl.
*H04Q 7/20* (2006.01)
(52) U.S. Cl. .................. 455/434; 455/67.11; 455/226.1
(58) Field of Classification Search .................. 455/434, 455/450, 452.1, 452.2
See application file for complete search history.

(56) References Cited

U.S. PATENT DOCUMENTS

| | | | |
|---|---|---|---|
| 5,729,539 A | 3/1998 | Heeschen et al. | |
| 6,463,054 B1 | 10/2002 | Mazur et al. | |
| 6,647,000 B1 * | 11/2003 | Persson et al. | 370/330 |
| 2001/0031638 A1 | 10/2001 | Korpeia et al. | |
| 2003/0026228 A1 * | 2/2003 | Jyrkka | 370/336 |
| 2003/0174645 A1 * | 9/2003 | Paratainen et al. | 370/229 |
| 2004/0192326 A1 | 9/2004 | Stern-Berkowitz et al. | |

* cited by examiner

*Primary Examiner*—Temica M Beamer

(57) ABSTRACT

A data packet transmission monitor (15) monitors the transmission of data packets in a given wireless communication system to determine (20) a predetermined condition. In response to determining the predetermined condition, the transceiver (14) for the base station (13) automatically sends (21) a signal to one or more wireless communication units (10) to cause the units (10) to make neighbor cell measurements. Optionally, the base station (13) sends such a signal when no data packets are to be sent by the base station (13). In another embodiment, the data packet transmission monitor (15) tracks (50) the transmission of data packets and determines (51) whether the transmissions allow for a certain number of neighbor cell measurements. If a certain number of neighbor cell measurements are not allowed, a signal is automatically sent (21) to the wireless communication unit (10) to make one or more neighbor cell measurements.

13 Claims, 4 Drawing Sheets

FIG. 3

| 33→ | R=0 | R=3 | | | | R=0 | R=1 | | R=1 | | R=0 | R=4 |
|---|---|---|---|---|---|---|---|---|---|---|---|---|
| 32→ | R=2 | | | R=2 | | | R=3 | | | | R=4 | |
| 31→ | R=1 | | R=0 | R=1 | | R=3 | | | | R=0 | R=1 | |
| 30→ | R=5 | | | | | | R=3 | | | | R=2 | |

34, 35, 36, 37

TIME →

FIG. 4

| 33→ | R=0 | R=3 | | | | R=0 | R=1 | | R=1 | | R=0 | R=4 |
|---|---|---|---|---|---|---|---|---|---|---|---|---|
| 32→ | R=1 | | R=3 | | | | R=3 | | | | R=4 | |
| 31→ | R=1 | | R=2 | | | R=3 | | | | R=0 | R=1 | |
| 30→ | R=5 | | | | | | R=3 | | | | R=2 | |

40, 41 TIME →

METHOD AND APPARATUS FOR EFFICIENT NEIGHBOR CELL MEASUREMENT

TECHNICAL FIELD

This invention relates generally to wireless communication systems and more particularly to systems using a plurality of communication channels and needing to measure the strength of signals from neighbor cells.

BACKGROUND

Wireless communication systems of various kinds are known in the art. Many such systems use wireless communication units to sense signals from neighbor cells to determine the strength of such signals. This measurement helps to ensure efficient handoffs for wireless communication units that move from one cell to another.

The neighbor cell measurement done by many known wireless communication systems occurs when the wireless communication unit has assurance no data will be sent to it for a sufficient length of time, which allows the transceiver to receive the signals from one or more neighboring cells allowing for a measurement of the strength of these signals. For example, a neighbor cell measurement opportunity exists when a system using only one transmission or communication channel makes a reservation of sufficient length on the communication channel to another wireless communication unit in the cell. Because the wireless communication unit monitors only a single communication channel and reservations of sufficient length occur often, neighbor cell measurement opportunities are quite frequent.

Certain known wireless communication systems utilize multiple communication channels. An example of such a system is the so-called Wideband iDEN® (WiDEN) technology. Some of these known systems perform neighbor cell measurements only when certain conditions occur. For example, neighbor cell measurement opportunities may only occur when all communication channels have sufficiently long reservations at the same time. To ensure proper handoffs, a wireless communication unit having the certain conditions necessary to make neighbor cell measurements will typically make the measurement according to a predetermined schedule such as once every 180 milliseconds on average. If the certain conditions do not occur, the wireless communication unit will delay making the scheduled neighbor cell measurements. Because neighbor cell measurements are necessary to ensure proper handoffs, however, the wireless communication unit will stop all communication to forcibly make neighbor cell measurements once a certain number of neighbor cell measurements are delayed. During this mode of operation typically called a forced neighbor cell mode, the wireless communication unit stops sending and receiving data for the amount of time necessary to make all of the delayed neighbor cell measurements thereby ensuring proper handoffs between cells. Such delays in data transmission during a forced neighbor cell mode may significantly harm the data throughput of the wireless communication unit.

BRIEF DESCRIPTION OF THE DRAWINGS

The above needs are at least partially met through provision of the method and apparatus for efficient neighbor cell measurement described in the following detailed description, particularly when studied in conjunction with the drawings, wherein:

FIG. 3 comprises a flow diagram as configured in accordance with various embodiments of the invention;

FIG. 4 comprises a flow diagram as configured in accordance with various embodiments of the invention;

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a determination of a predetermined condition is made, and in response the base station automatically sends a signal to one or more wireless communication units such that the wireless communication units make one or more neighbor cell measurements. Depending on the predetermined condition, neighbor cell measurements are made at certain times or during certain situations such that forced neighbor cell mode situations are minimized or eliminated. By minimizing the occurrences of forced neighbor cell mode situations, the data throughput is improved while maintaining efficient and effective handoffs for the wireless communication units.

Figure 1:
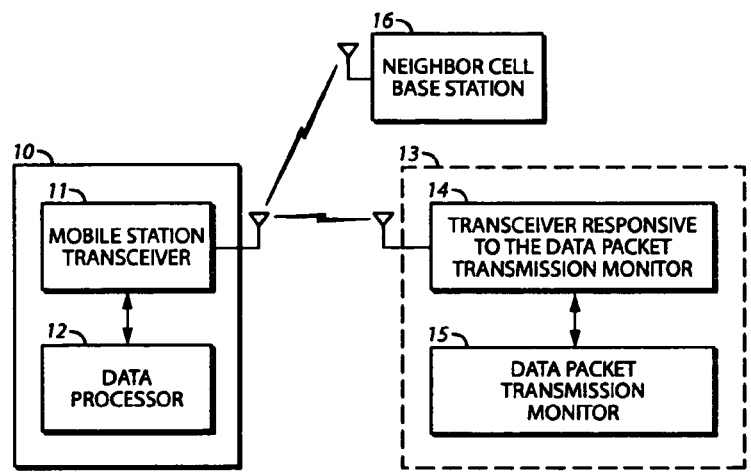
FIG. 1 comprises a block diagram as configured in accordance with various embodiments of the invention.

Referring now to the drawings and in particular to FIG. 1, a wireless communication unit 10 is provided. The wireless communication unit 10 includes a mobile station transceiver 11 and a data processor 12. The data processor 12 processes the data received by the wireless communication unit 10 and controls when neighbor cell measurements are made by the wireless communication unit 10. The data processor 12 includes structure known in the art. The wireless communication unit 10 is in communication with a base station 13. The base station 13 includes certain fixed network equipment as known in the art. The fixed network equipment includes a transceiver 14 that is responsive to a data packet transmission monitor 15. The wireless communication unit 10 is also in communication with a neighbor cell base station 16. One skilled in the art will recognize that the wireless communication unit 10 may be in communication with a plurality of neighbor cell base stations 16.

Figure 2:
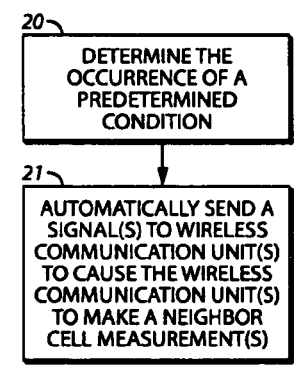
FIG. 2 comprises a flow diagram as configured in accordance with various embodiments of the invention.

A method of operation for making neighbor cell measurements will now be described with reference to FIG. 2. First, the fixed network equipment at the base station 13 determines 20 the occurrence of a predetermined condition. Then, in response to determining 20 the occurrence of the predetermined condition, the base station transceiver 14 automatically sends 21 a signal to the wireless communication unit 10 that causes the wireless communication unit 10 to make one or more neighbor cell measurements. In various embodiments, the data packet transmission monitor 15 continuously monitors the transmission of data packets by the transceiver 14 to determine 20 the occurrence of the predetermined condition.

In a preferred embodiment, the data packet transmission monitor 15 monitors the transmission of data packets by the transceiver 14 to determine that the base station 13 has no data packets to transmit to the one or more wireless communication units 10 in communication with the base station 13. Once the data packet transmission monitor 15 makes this determination, the transceiver 14 automatically sends 21 a signal to the wireless communication unit 10 to cause the unit 10 to make one or more neighbor cell measurements. One of skill in the art will recognize that such data packets can be WiDEN data packets in an embodiment where the base station 13 and wireless communication unit 10 use the WiDEN technology to send and receive such wireless data packets.

Upon receiving a signal from the base station 13, the data processor 12 determines whether the signal is one indicating the need for a neighbor cell measurement. In a preferred embodiment, the signal is an allocation or reservation of a certain number of slots. Upon receiving the allocation of a certain number of slots, the wireless communication unit 10 makes one or more neighbor cell measurements.

Figure 7:
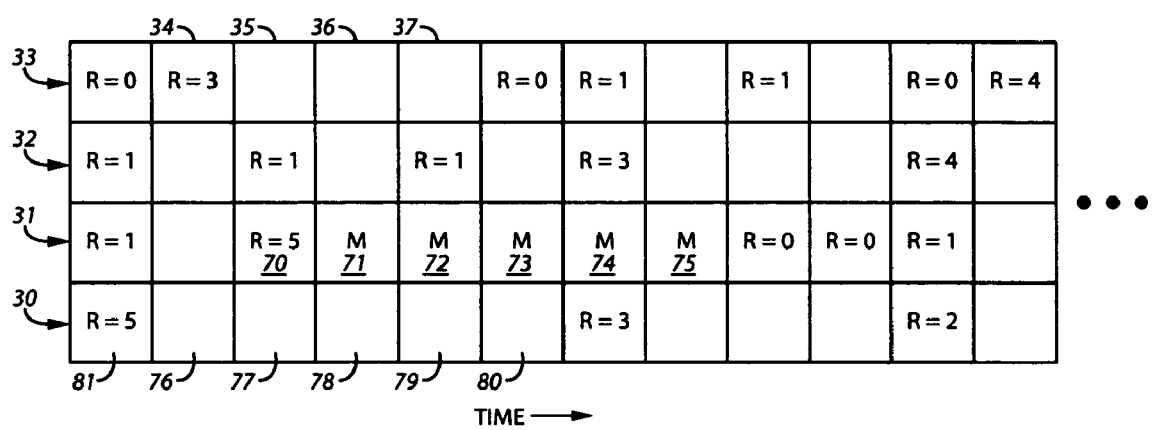
FIG. 7 comprises a representation of communication channels as used in accordance with various embodiments of the invention.

The allocation of slots and method of making neighbor cell measurements will be described with reference to FIGS. 3 and 4. The preferred wireless communication unit 10 uses a varying bandwidth system using varying stepped multipliers as known in the art. An example of such a technology is the WiDEN technology which uses up to four transmission channels 30, 31, 32, and 33. Each transmission channel operates at a 25 kHz bandwidth so that the composite bandwidth is 25 kHz, 50 kHz, 75 kHz, or 100 kHz in systems utilizing the WiDEN technology. Each transmission channel 30, 31, 32, and 33 sends and receives data in packets over time. In other words, each packet is given a certain time reservation to be sent or received on a given channel. This time reservation is known in the art as a "time slot" or "slot," and slots are commonly represented in a grid form as seen in FIGS. 3, 4, and 7. Some wireless communication units utilize only a single channel while others utilize all of the available communication channels, which allow a higher data throughput. As such, various embodiments can be used on systems utilizing any number of communication channels.

When data packets are received by a wireless communication unit 10, the first data packet will include bits to indicate to the data processor 12 the number of slots that need to be reserved to complete a given transmission. For example, slot 34 indicates that the wireless communication unit 10 received a reservation of three slots 35, 36, and 37. Only data for that transmission can be sent or received on transmission channel 33 during that reservation. Certain reservations are null reservations such that for the number of slots indicated, no data is sent or received on that given channel.

In prior systems, to make a neighbor cell measurement, all four transmission channels 30, 31, 32, and 33 needed to have reservations in two consecutive slots at the same time as seen in FIG. 4 at slot columns 40 and 41. This configuration of reservations allowed for enough time for the wireless communication unit transceiver to change frequency and receive signals from one or more neighbor cells. To make the neighbor cell measurement, the wireless communication unit 10 then determines the relative strength of the signals from the one or more neighbor cell base stations 16. The data processor 12 uses this information to determine when and how to make a handoff between base stations. Unfortunately, it is unlikely given typical data packet transmission patterns that all four transmission channels will randomly align consecutive null slots to consistently avoid forced neighbor cell mode situations. Therefore, in various embodiments the base station 13 will automatically send a signal to trigger neighbor cell measurements by the wireless communication unit 10 upon the occurrence of the predetermined condition.

In a preferred embodiment illustrated in FIG. 5, the predetermined condition is determined as follows. The data packet transmission monitor 15 actively tracks 50 the transmission of data packets to and from the base station 13. While tracking 50 the transmission of data packets, the data packet transmission monitor 15 determines 51 whether the data packets transmitted over a given amount of time would allow the wireless communication units 10 to make a certain number of neighbor cell measurements. In one embodiment, this determination includes determining whether the one or more wireless communication units 10 in communication with the base station 13 have had sufficient reservations to align at least two consecutive null slots on all the transmission channels as seen in FIG. 4. If the number of data packets transmitted allows for a sufficient number of neighbor cell measurements, the wireless communication system continues 52 its normal operation. If the number of data packets transmitted fails to allow sufficient neighbor cell measurements, the base station transceiver 13 that is responsive to the data packet transmission monitor 15 will automatically send 21 a signal to one or more wireless communication units 10 to cause the units 10 to make one or more neighbor cell measurements. One of skill in the art will recognize that the number of neighbor cell measurements missed before sending the signal can be adjusted for a given system.

In one such system, the wireless communication unit 10 will make a neighbor cell measurement on average once every 180 milliseconds if the number and type of data packets transmitted by the base station allows for the measurements. If the base station 13 transmits data packets such that the wireless communication unit 10 cannot make a neighbor cell measurement for approximately 3 seconds, during which time the wireless communication unit 10 misses around sixteen neighbor cell measurements, the wireless communication unit 10 will go into the forced neighbor cell mode. Thus, when the data packet transmission monitor 15 determines that the wireless communication unit 10 is close to a forced neighbor cell mode or sixteen missed neighbor cell measurements, the transceiver 14 will automatically send 21 a signal to the wireless communication unit 10 to make one or more neighbor cell measurements.

Figures 5, 6:
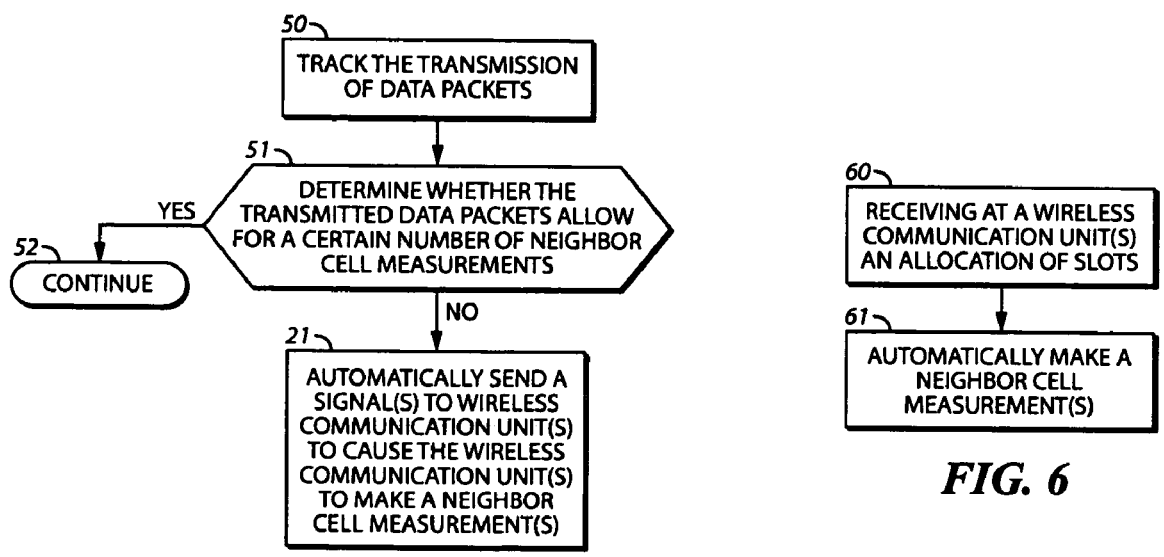
FIG. 5 comprises a representation of communication channels as used in certain data packet communication systems.
FIG. 6 comprises a representation of communication channels as used in certain data packet communication systems.

In a preferred embodiment illustrated in FIG. 6, the signal received 60 by the wireless communication unit 10 includes a reservation or allocation of slots. In response to receiving 60 this reservation, the wireless communication unit 10 automatically makes 61 a neighbor cell measurement.

The signal from the base station 13 can be configured in any number of ways to automatically trigger neighbor cell measurements by the wireless communication unit 10. For example, in various embodiments the wireless communication unit 10 will make a neighbor cell measurement upon receiving a reservation of a certain number of slots, a reservation of a certain number of null slots, or a reservation of a certain number of slots in combination with a signal indicating that the slots are for making at least one neighbor cell measurement. In a preferred embodiment represented in FIG.

7, the wireless communication unit 10 will automatically make a neighbor cell measurement when it receives a reservation of five null slots on any one communication channel with a signal that indicates that those five null slots are to be used for making neighbor cell measurements. The wireless communication unit 10 receives the reservation and signal such that the data processor 12 reads the signal at slot 70 and allocates a group of slots 71, 72, 73, 74, and 75 on transmission channel 31 for use by the wireless communication unit 10 to make neighbor cell measurements. Because these slots are now set aside by the data processor 12 for making neighbor cell measurements, the reservations on the other transmission channels 30, 32, and 33 are ignored, and these channels need not align null slots with the reserved slots to make neighbor cell measurements.

One skilled in the art will understand that the equipment can be configured such that a reservation of any given number of slots or null slots will trigger one or more neighbor cell measurements in those reserved slots. In one alternative embodiment, the wireless communication unit 10 will automatically make neighbor cell measurements upon receiving a reservation of five null slots without a separate signal indicating that the slots are for making neighbor cell measurements. Here, the data processor 12 will automatically make neighbor cell measurements using slots indicated by reference numerals 76, 77, 78, 79, and 80 in a given transmission channel 30 because it received a reservation of five slots at slot 81. These measurements are made in addition to the neighbor cell measurements made using the transmission channel 31 at slots 71, 72, 73, 74, and 75.

So configured, a wireless communication unit, through signals received from the base station, can more efficiently make neighbor cell measurements. By actively triggering only one channel of a multi-channel communication system to make neighbor cell measurements, the neighbor cell measurements are not dependent on a random occurrence of circumstances. Further, by triggering the neighbor cell measurements based on the data packets transmitted over time, the various embodiments avoid forced neighbor cell mode situations that harm data throughput.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   monitoring, at a base station, a transmission of data packets for an occurrence of a predetermined condition that permits a wireless communication unit to make a neighbor cell measurement; and
   automatically sending a signal from the base station to at least one wireless communication unit in response to the occurrence of the predetermined condition such that the at least one wireless communication unit makes at least one neighbor cell measurement.

2. The method of claim 1 wherein monitoring the transmission of data packets for an occurrence of a predetermined condition further comprises determining that the base station has no data packets to transmit.

3. The method of claim 2 wherein determining that the base station has no data packets to transmit further comprises determining that the base station has no WiDEN data packets to transmit.

4. The method of claim 1 wherein monitoring the transmission of data packets for an occurrence of a predetermined condition further comprises:
   tracking transmission of data packets from the base station to the at least one wireless communication unit; and
   determining that the data packets transmitted from the base station over a given amount of time fail to allow the at least one wireless communication unit to make a certain number of neighbor cell measurements.

5. The method of claim 1 wherein automatically sending a signal from a base station to at least one wireless communication unit in response to the predetermined condition such that the at least one wireless communication unit makes at least one neighbor cell measurement further comprises sending a signal to the at least one wireless communication unit indicating a reservation of a certain number of slots.

6. The method of claim 5 wherein sending a signal to the at least one wireless communication unit indicating a reservation of a certain number of slots further comprises sending a signal to the at least one wireless communication unit indicating that the reservation of the certain number of slots is for making at least one neighbor cell measurement.

7. The method of claim 5 wherein sending a signal to the at least one wireless communication unit indicating a reservation of a certain number of slots further comprises the at least one wireless communication unit reserving the certain number of slots on a given transmission channel and using the certain number of slots on the given transmission channel to make at least one neighbor cell measurement.

8. The method of claim 7 wherein the given transmission channel ignores one or more reservations on one or more other transmission channels.

9. The method of claim 5 wherein the certain number of slots are null slots.

10. The method of claim 1 wherein automatically sending a signal from a base station to at least one wireless communication unit in response to the predetermined condition such that the at least one wireless communication unit makes at least one neighbor cell measurement further comprises sending a signal to the at least one wireless communication unit indicating that a given number of slots are to be used by the at least one wireless communication unit to make at least one neighbor cell measurement.

11. The method of claim 10 wherein the given number of slots are null slots.

12. The method of claim 1 wherein making at least one neighbor cell measurement further comprises:
   receiving at the at least one wireless communication unit at least one neighbor cell base station signal;
   determining a strength of each of the at least one neighbor cell base station signals received by the at least one wireless communication unit.

13. The method of claim 1 wherein the base station and the at least one wireless communication unit use WiDEN technology to send and receive data packets.

* * * * *